Feb. 2, 1932. H. W. GRONEMEYER 1,843,155
PUMP
Filed Aug. 1, 1928 2 Sheets-Sheet 1
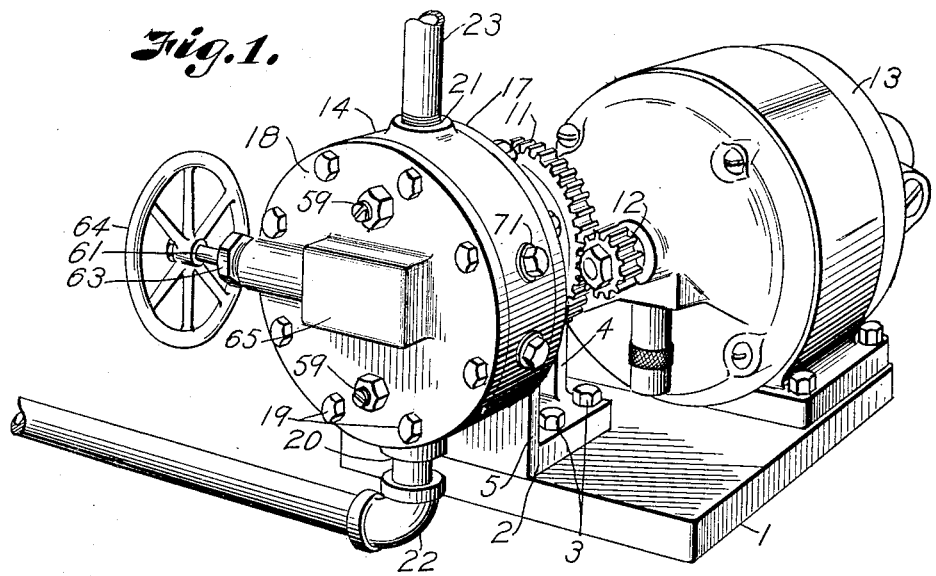
Fig.1.
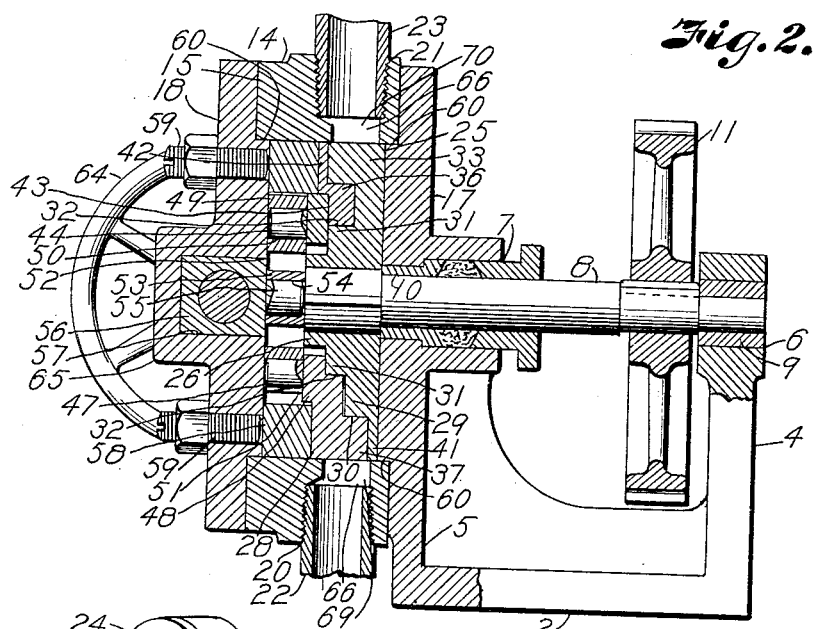
Fig.2.
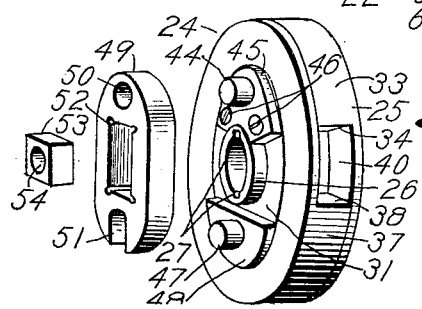
Fig.3.
INVENTOR.
Herbert W. Gronemeyer.
BY
ATTORNEY Feb. 2, 1932.  H. W. GRONEMEYER  1,843,155
PUMP
Filed Aug. 1, 1928   2 Sheets-Sheet 2

INVENTOR.
Herbert W. Gronemeyer
BY
ATTORNEY

Patented Feb. 2, 1932

1,843,155

UNITED STATES PATENT OFFICE

HERBERT W. GRONEMEYER, OF KANSAS CITY, MISSOURI, ASSIGNOR TO SHEFFIELD STEEL CORPORATION, OF KANSAS CITY, MISSOURI, A CORPORATION OF DELAWARE

PUMP

Application filed August 1, 1928. Serial No. 296,757.

My invention relates to proportionate feeding devices and more particularly to valves for measured delivery of fluid from a flow line, the principal object of the invention being to deliver measured quantities of fluid irrespective of head pressure or viscosity of the fluid, to adjust the feeding means for varying the quantity delivered at each operation, to eliminate interruption of flow due to valve stoppages and to provide for cleaning of the device by a reversal of flow therethrough.

In the handling of viscous liquids, or any liquids containing even minute particles of foreign matter, great difficulty is often encountered in maintaining a constant flow of a small quantity, such as the amount of lubricant being delivered to reservoirs, the amount of fuel oil being fed to a small furnace, the addition of a definite amount of liquid in a continuous mixing process, etc.

The usual method at present is to supply the liquid under pressure to a small valve, generally of the needle type, although there are others in use such as the "split needle" valve or the "V-notch" cock. The last two are improvements over the needle valve just as the needle valve is an improvement over the ordinary globe or gate valve, either of which is wholly incapable of passing a small quantity of liquid as above described for any period of time.

When it is considered that some processes require the flow of a liquid at an absolutely uniform rate in so small a quantity as one-half gallon per hour, some idea may be gained as to the tiny size of aperture or orifice required even though the pressure causing the flow is dropped to as low as one-half pound per square inch. The size of the particles which clog the aperture need not be as large as the aperture itself, for the reason that the opening is not washed clean because of the low pressure, and any dirt or sediment is allowed to collect at the restriction and total stoppage of the flow soon follows. Straining has been resorted to, but this is difficult, as the mesh of the straining screen must be extremely fine, which in turn results in excessive pressure drop through the strainer and requires frequent cleaning, while the screen itself must be well supported to prevent rupture due to the pressure. This all tends to increase the cost of the strainer as well as the cost of its operation, and fails to accomplish the purpose completely, since it has been found that even in oil which was carefully screened, gelatinous lumps re-appeared which seriously affected burner operation.

It is one object of the invention to eliminate the above difficulties by mechanically isolating a measured quantity of the fluid delivered under pressure from a flow line and discharging the measured quantity toward the outlet and further to adjust the transferring element to receive larger or smaller quantities.

In accomplishing this object I have provided improved details of structure, the preferred forms of which are illustrated in the accompanying drawings, wherein:

Fig. 1 is a perspective view of a motor-operated proportionate feeding device inserted in a flow line.

Fig. 2 is a vertical central section of the device.

Fig. 3 is an enlarged detail perspective view of a rotating feeding element illustrating cooperating rotors providing a liquid-carrying pocket and a member connecting the rotors.

Figure 4:
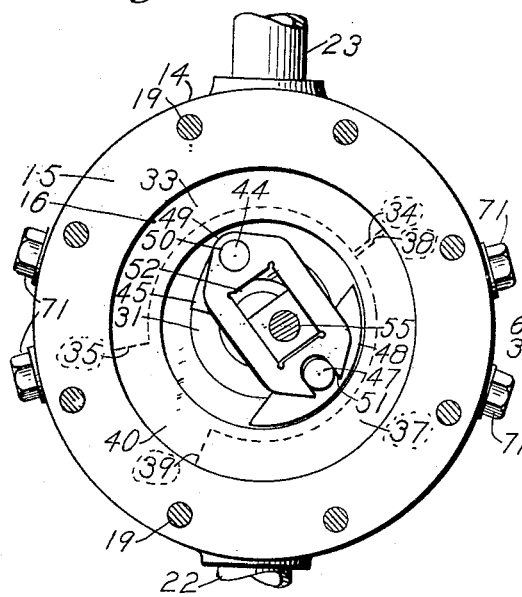
Fig. 4 is an elevation of the device with the closure member removed.

Referring in detail to the drawings:

1 designates a base on which is mounted a bracket 2 secured by bolts 3 and having upstanding spaced arms 4 and 5 provided with bearing openings 6 and 7 for receiving a shaft 8 and bearings 9 and 10 in said openings. On the inner end of the shaft is keyed a gear 11 meshed with a pinion 12 of a motor 13 supported from the base 1.

A housing 14 enclosing the outer end of the shaft comprises a body 15 having a cylindrical bore or inner wall 16, an end closure 17 comprising an extension of the bracket 5 whereby the housing is supported from the base, and an opposite end closure or cover plate 18, the closures being attached to the body by bolts such as 19.

The housing has an inlet 20 and an outlet 21 connected respectively with a flow line 22 and a delivery line 23, and contains fluid feeding elements adapted for actuation by the shaft and later particularly described.

A feeder generally designated 24 and illustrated in assembled condition in Fig. 3, is rotatable in the housing and comprises a member 25 having a longitudinally grooved hub 26 keyed to the shaft 8 by a spline 27 and a mating member 28 adapted for rotation at variable speeds from the member 25, and for oscillation with respect thereto, as will be particularly described.

The member 25 comprises a roller-like body 29 having a cylindrical peripheral face 30 spaced from the inner wall 17 of the housing, an inwardly extending hub-like boss 31 on the inner face of the body having a peripheral bearing face 32, and an arcuate flange 33 extending circumferentially over a portion of the periphery of the body and projecting from the body into alignment with the boss 31, the flange having radial end walls 34 and 35. The hub 26 extends slightly beyond the face of the boss for a purpose presently described.

The member 28 comprises a roller-like body 36 adapted to seat rotatably over the boss 31 and between the flange 33 and said boss and is provided with a flange 37 similar to the flange 33 extending over a portion of its periphery and having end walls 38 and 39 adapted for alternate spacing from the adjacent end walls 34 and 35 of the flange 33 of the member 25.

The body 36 of the member 28 has substantially the same diameter as the body 29 of the member 25 and is in rotationally slidable face to face contact therewith, whereby the peripheries of the two members cooperate to provide the inner wall of a transferring recess or pocket 40 the ends of which are formed by the adjacent end walls such as 34 and 38, when the same are spaced, and the outer wall of which is formed by the inner wall 16 of the housing.

The end closures of the housing may comprise the side walls for said transferring pocket, but I preferably provide ring-like radial wings or flanges 41 and 42 on the outer edges and opposite sides of the respective bodies 29 and 36, the peripheries of the flanges engaging the inner wall of the housing, to support the members 25 and 28 concentrically of the housing, and these flanges serve as side walls for the pockets.

The ring 42 projects from the face of the body 36 opposite to the face that engages the other member, and its inner edge is spaced from the inner edge of the body to provide a shoulder 43, the face of the boss 31 being adapted to lie in the plane of said shoulder 43, while the hub 26 projects beyond said plane.

A pin 44 is fixedly engaged with and supported from the member 25 by a yoke 45 attached to the boss 31 by screws 46, the body of the yoke overlying the shoulder 43 and the branches engaging the outer end of the hub 26. A similar pin 47 is fixed to the member 28 by a bracket 48 preferably integral with the ring and body of the member 28. The pins project equally from the face of the ring 42, to receive a bar 49 presently described for connecting the members. The yoke 45 serves to retain the member 28 rotatably in engagement with the member 25.

The members 25 and 28 are connected for operation of the member 28 from the member 25, by said bar 49 which has an opening 50 adjacent one end for mounting on the pin 44 and an arcuate socket 51 at the other end for mounting on the pin 47, and an elongated longitudinal rectangular slot 52 in which is slidably mounted an eccentric block 53 having an opening 54 to receive a pivot pin 55 adapted for fixed positioning to control the relative movements of the members. The pin 55 projects inwardly from a block 56 slidable in a slot 57 of the retaining cover plate 18, and is adapted to restrain the block 53 to a desired relation with the axis of the feeder 24.

The housing is preferably wider than the width of the assembled parts of the feeder and a sealing ring 58 having an outside diameter equal to the diameter of the housing bore is mounted in wiping contact with the ring 42 and wiped into sealing contact therewith by bolts 59. The sealer 58 overlies the portions of the yoke 45 and bracket 48 which project beyond the face of the ring 42.

The retaining cover 18 and end closure 17 are provided with bosses such as 60 engageable with the housing wall 16, and respectively with the ring 58 and member 25 for securely mounting the cover on the housing and sealing the joints, the member 25 sliding rotationally over the face of the boss in the closure 17.

The block 56 is adjustable in the slot 57 by a threaded member screw threadedly engaged with the block and having a smooth stem 61 rotatable in a packing member 62 retained by a gland 63, the member 61 being restrained against longitudinal movement by engagement with opposite walls of the slot and being operable by a wheel 64. An offset wall 65 closes the outer opening of the slot.

In the cylindrical inner wall 16 of the housing is preferably an annular groove 66 communicating with the inlet and outlet. Arcuate dividing plugs 67 and 68 having thickness equal to the depth of the grove, and outer and inner walls conforming to the curvature of the wall 16, are diametrically oppositely positioned in the groove to divide the same into inlet and outlet reservoirs or chambers 69 and 70, the plugs being secured to the housing by bolts 71 extending radially therethrough. The pockets may therefore receive liquid from the inlet chamber and transfer it to the outlet chamber.

It is apparent from the above description that the motor may continuously rotate the member 25 through the pinion and gear and that the member 28 will be rotated by the member 25 or by the connecting bar 49 and pin 55.

If the pin 55 is adjusted so that it extends in alignment with the common axis of the members 25 and 28, the member 28 will be rotated from the member 25 continuously at the same speed as the said member 25, and liquid received from the inlet will be transferred to a position adjacent the outlet.

Shifting of the block 56 to position the pin 55 eccentrically of the common axis, will cause the member 25 to move the member 28 at a faster speed than its own over part of a revolution and at a slower speed over the other part of the revolution. The result of such variable speed is that adjacent ends of flanges are alternately spaced and brought toward each other, the second member oscillating with respect to the first member.

Figure 5:
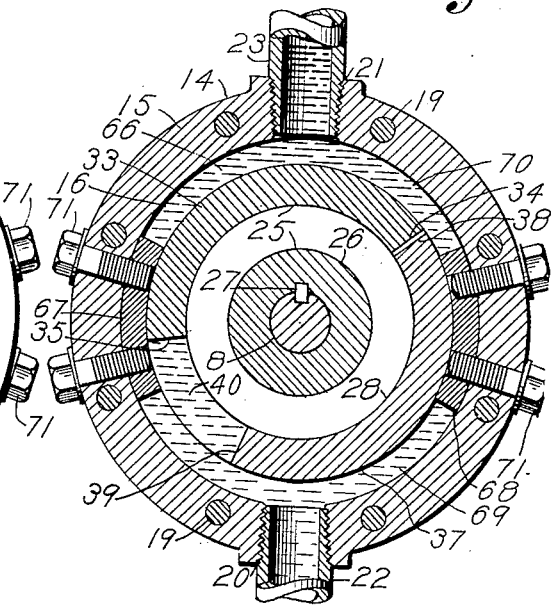
Fig. 5 is a central cross section.
Figure 6:
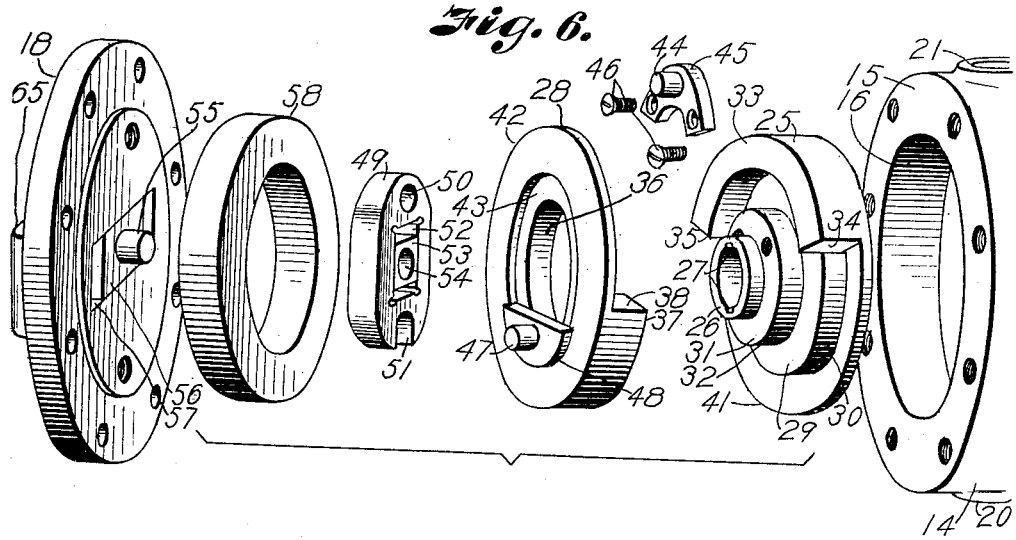
Fig. 6 is a perspective view of the members of the device shown separated.
Figure 7:
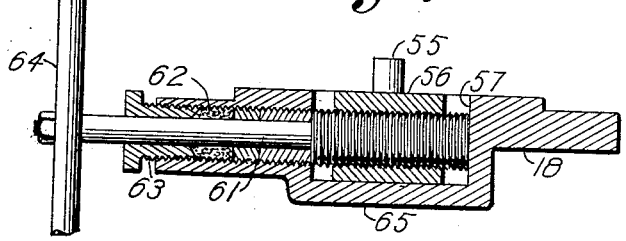
Fig. 7 is a vertical longitudinal section of adjustable means for controlling the relative speeds of rotation of the members comprising the feeder.

The parts are so adjusted that the adjacent flanges are spaced to provide a liquid carrying pocket as in Figs. 3 and 5, where said adjacent ends are moving in clock wise direction into communication and through the arc of communication with the inlet chamber. Liquid moving into the housing is therefore received by said transferring pocket and is carried past the chamber-dividing plug 67 into communication with the outlet chamber 70. The spacing of the flange ends produces suction which tends to draw liquid through the inlet into the housing.

The speed control members are further so arranged that the speed of the variable member 28 is reduced relative to the speed of the operating member 25 while the transferring pocket is thus in communication with the outlet chamber whereby the adjacent ends of the flanges forming end walls of the pocket approach each other and the liquid is expelled from the feeder into the chamber and outwardly through the outlet of the housing.

Fig. 5 illustrates the positions of the opposite ends of the flanges at one stage of operation wherein one set of adjacent flange ends are shown in a position adjacent the edge of the outlet chamber through which the flange ends have passed, and the other set of flange ends are shown spaced and in communication with the inlet chamber; continued clockwise movement of the feeder, spacing the ends to provide a pocket and to bring the pocket into communication with the outlet chamber.

The succeeding step in operation will obviously be the retardation of the speed of the variable member when the pocket is in communication with the outlet chamber, to squeeze the liquid from the feeder, at which moment the flange ends which are shown almost engaged in Fig. 5 will be entering the area of the inlet chamber and will be in process of separation to provide a transferring pocket.

The block 56 may be adjusted to provide the maximum retardation and acceleration of the speed of the variable member for maximum spacing of the flange ends during a cycle of operation, and may also be adjusted to provide less variation and consequently less spacing of the flange ends at maximum position, in which case the adjacent flange ends would not come into face to face contact during the instant of maximum spacing of the opposite set of flange ends but would constantly carry a small quantity of the liquid.

In any event, however, the variation in speed would cause an increase in the capacity of the pocket while it is in communication with the inlet chamber and a decrease in capacity when it is in communication with the outlet chamber, thus transferring a portion of liquid from one chamber to the other and ejecting a quantity equal to the received amount toward the outlet.

It is apparent that liquid may be transferred from either housing port to the other, depending upon the designation of the inlet and the order of retardation and acceleration of the member 28. When it is desirable to reverse flow of the fluid, for example for cleaning out apparatus, the direction of rotation of the feeder may be reversed, or the pin 55 may be shifted to the opposite side of the axis of the rotors, and the adjacent ends will then separate while in communication with the port previously serving as an outlet and will close oppositely to eject fluid through the port previously designated an inlet.

What I claim and desire to secure by Letters Patent is:

1. A liquid feeding device comprising a housing having an inlet and an outlet, a feeder comprising a member rotating in the housing at constant speed and a member coaxial therewith and rotating at variable speed for alternately receiving liquid from the inlet and discharging the liquid to the outlet, means connecting the members for rotation of the second member from the first member, and means for varying the rate of movement of the second member for aforesaid alternate reception and discharge of liquid including connected slidable members adjustably supported eccentrically of the common axis of the first mentioned members and engaging said connecting means.

2. In combination with a flow line carrying fluid under pressure, a liquid feeding device comprising a housing having an inlet connected with the flow line and an outlet, a feeder in the housing comprising a member rotating at constant speed and a member co-axial therewith and rotating at variable speed for alternately receiving liquid from the inlet and discharging the liquid to the outlet, means connecting the members for rotation of the second member from the first member, means varying the rate of movement of the second member for aforesaid alternate reception and discharge of liquid including means slidably adjustably supported eccentrically of the common axis of the members and slidably engaging said connecting means, and means actuating the first member.

3. A liquid feeding device comprising a housing having an outlet and an inlet, and a feeder for transferring liquid from the inlet to the outlet comprising a member rotating in the housing at constant speed and a second member rotating alternately faster and slower than the first member, and co-axial therewith, and means for rotating the second member from the first member including a bar having opposite ends pivotally connected with the two members and having a longitudinal slot, a block having an opening and slidable in the slot, a retainer supported by the housing and having a slot, and a second block adjustably fixed in said slot and having a pin movably engaged in the opening of said first block for restraining the first block to eccentric positions in relation to the common axis of the members for alternately accelerating and retarding the speed of the second member with reference to the first member.

4. A liquid feeding device comprising a housing having an outlet and an inlet, and a feeder for transferring liquid from the inlet to the outlet comprising a member rotatable in the housing at constant speed and a second member rotatable alternately faster and slower than the first member, and co-axial therewith, and means for rotating the second member from the first member including a bar having opposite ends pivotally connected with the two members and having a longitudinal slot, a block slidable in the slot, a fixed retainer supported by the housing and having a slot, and a second block adjustably fixed in said slot and having a pin movably engaged with said first block for restraining the first block to planetary movement about the common axis of the members for alternately accelerating and retarding the speed of the second member with reference to the first member, said second block being adjustable to vary the relative movements of the two members.

5. In a device of the character described including a pair of rotors rotating on a common axis, means for rotating the second rotor from the first rotor including a bar having opposite ends pivotally connected to the two rotors and a pin mounted in fixed position with reference to the axis of the rotors and engaging said bar to enforce movement of the second rotor by the first rotor.

6. In a pump of the character described including a housing having an inlet and an outlet and a pair of rotors in the housing adapted to form a pocket for transferring liquid from the inlet to the outlet, slotted rotating means for moving the second rotor from the first rotor, and means including a block movable transversely of the housing and a member slidable in the slot of said rotating means for shifting the rotating means to vary the character of the movement of the second rotor by the first rotor.

7. In a pump of the character described including a housing having an inlet and an outlet, a rotor rotating in the housing at constant speed, and a second rotor cooperating with the first rotor to form a liquid receiving and discharging pocket, means for rotating the second rotor from the first rotor including a bar having opposite ends pivotally connected with the two rotors and having a longitudinal slot, a block slidable in the slot, and a pin engaged with said block and movable with reference to the housing for moving the bar to eccentric positions in relation to the common axis of the rotors.

In testimony whereof I affix my signature.

HERBERT W. GRONEMEYER.